A. P. ANDERSON.
REFRIGERATING APPARATUS.
APPLICATION FILED MAY 29, 1918.
1,340,646.
Patented May 18, 1920.
3 SHEETS—SHEET 3.
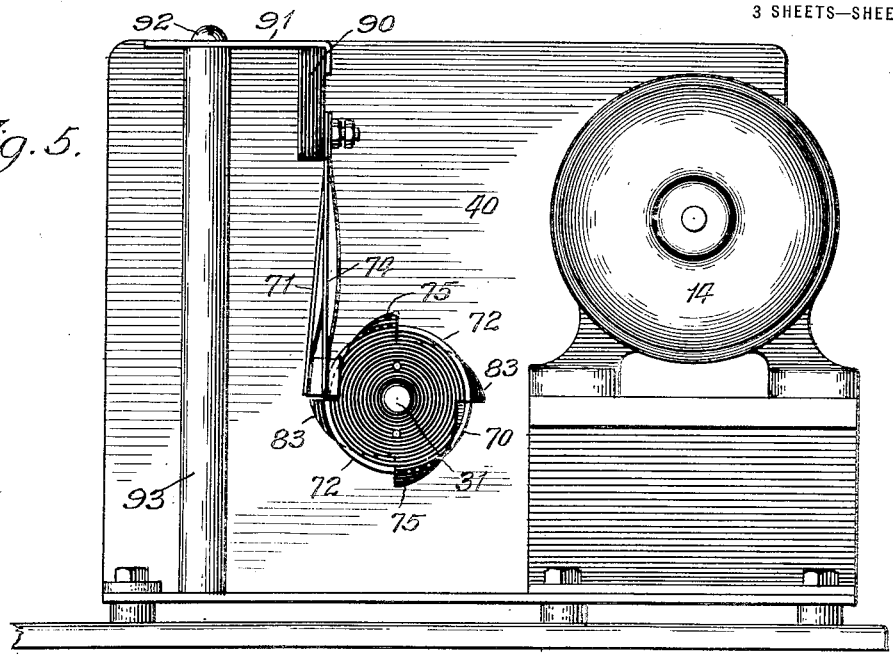
Fig. 5.
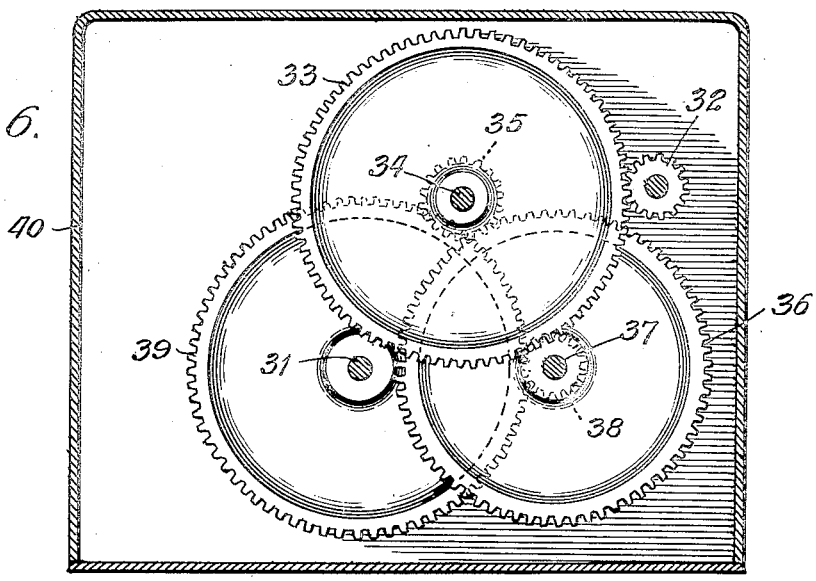
Fig. 6.
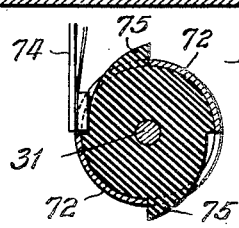
Fig. 6ᵃ.
Witness:
John Endere
Inventor:
August P. Anderson
by Fred Gulach
his Atty.

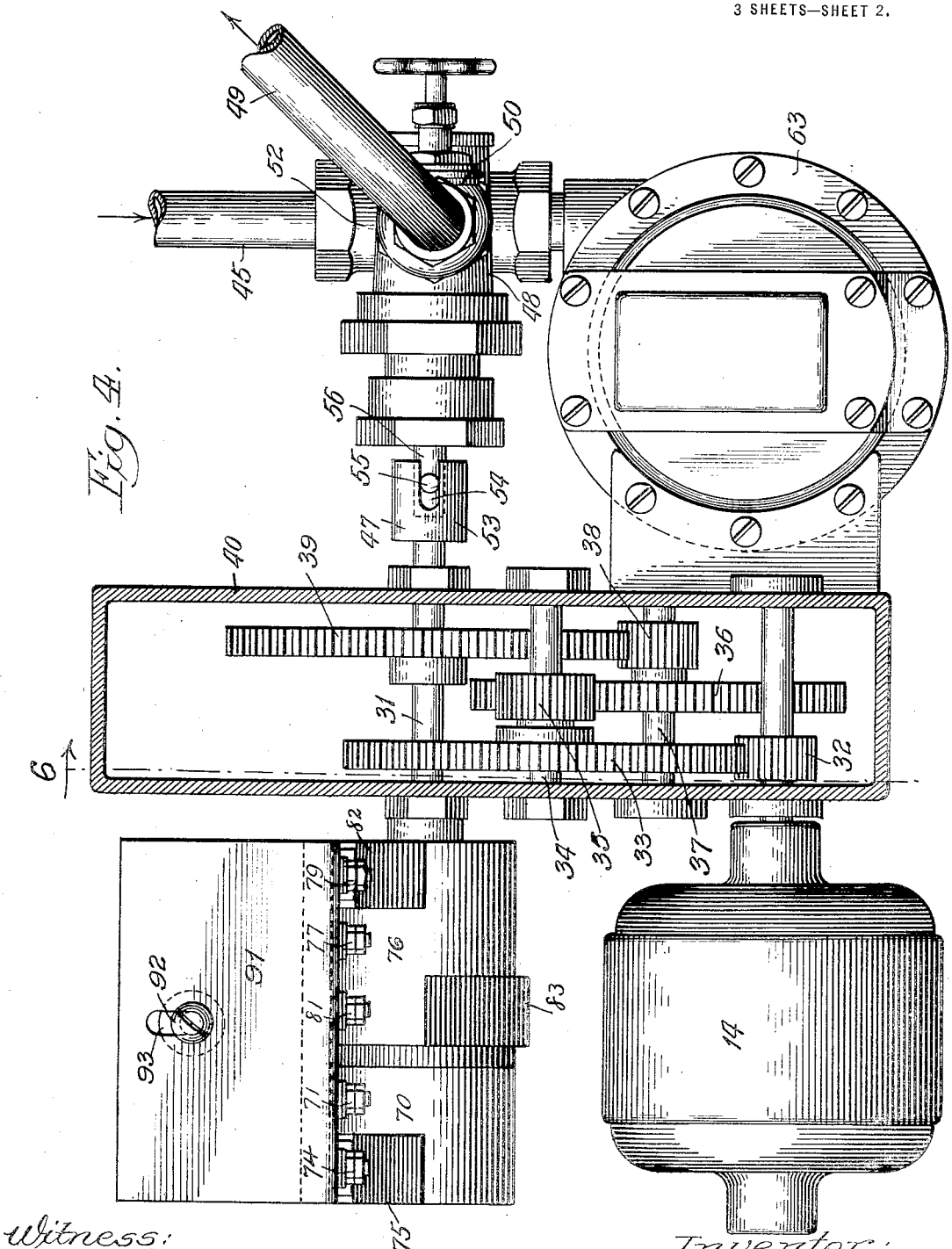

A. P. ANDERSON.
REFRIGERATING APPARATUS.
APPLICATION FILED MAY 29, 1918.
1,340,646.
Patented May 18, 1920.
3 SHEETS—SHEET 1.
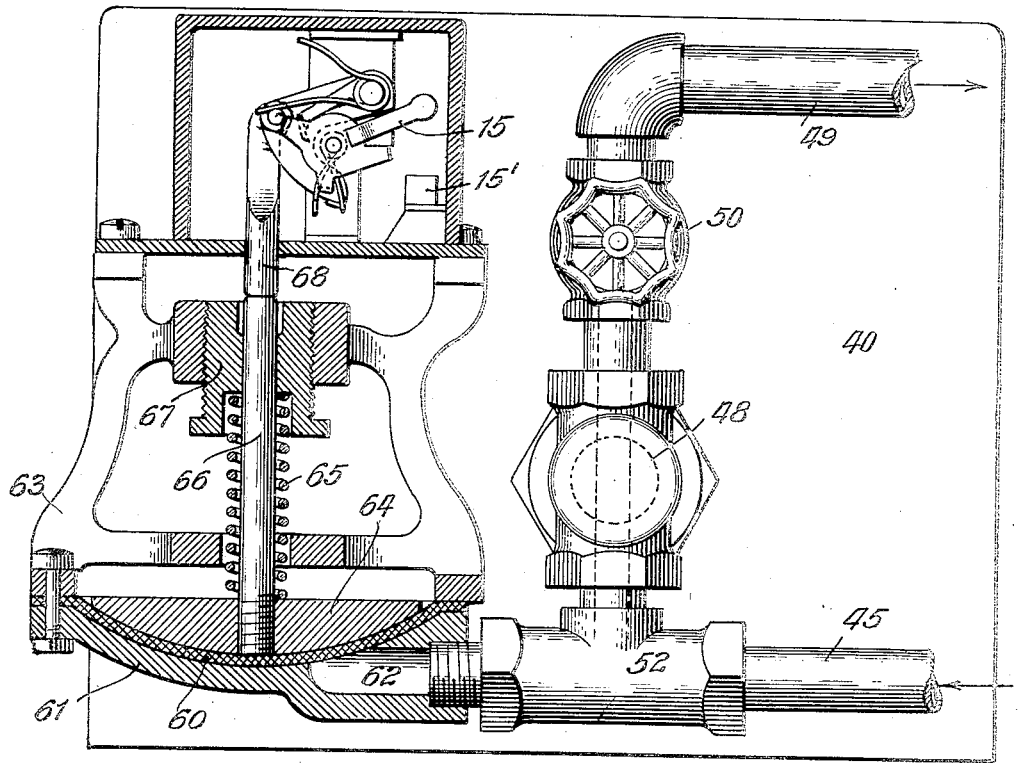
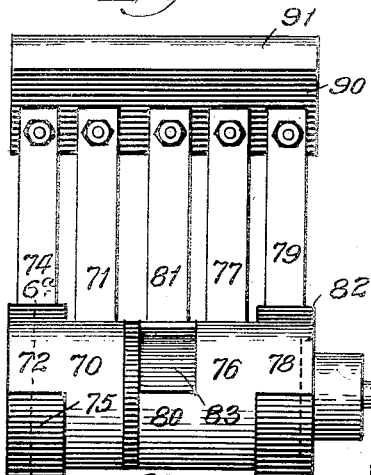
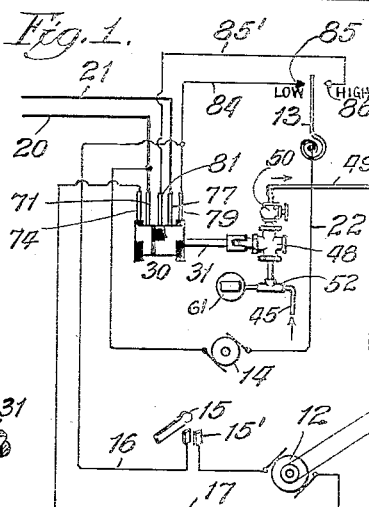
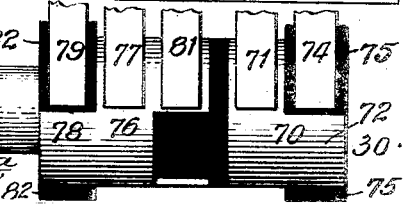
Witness:
John Enders
Inventor:
August P. Anderson
Fred Gerlach
his Atty.

UNITED STATES PATENT OFFICE.

AUGUST P. ANDERSON, OF CHICAGO, ILLINOIS.

REFRIGERATING APPARATUS.

1,340,646.  Specification of Letters Patent.  Patented May 18, 1920.

Application filed May 29, 1918. Serial No. 237,201.

*To all whom it may concern:*

Be it known that I, AUGUST P. ANDERSON, a citizen of the United States, and a resident of Chicago, in the county of Cook and State of Illinois, have invented certain new and useful Improvements in Refrigerating Apparatus, of which the following is a full, clear, and exact description.

The invention relates to mechanism for automatically controlling refrigerating apparatus and its object is to provide improved controlling mechanism for automatic refrigerating systems.

The invention consists in the several novel features hereinafter set forth and more particularly defined by claims at the conclusion hereof.

In the drawings: Figure 1 is a diagram of a refrigerating apparatus embodying the invention. Fig. 2 is a view partly in elevation and partly in section of the device controlled by the pressure of cooling water for controlling the electrical circuit for the compressor motor. Figs. 3 and 3ª are elevations of the circuit controlling mechanism operated by the starting motor viewed from opposite sides respectively. Fig. 4 is a view partly in plan and partly in section of the starting motor and the circuit controller and mechanism operated thereby. Fig. 5 is an elevation of the mechanism shown in Fig. 4. Fig. 6 is a section taken on line 6—6 of Fig. 4. Fig. 6ª is a section taken on line 6ª—6ª of Fig. 3.

The invention is shown as applied to a refrigerating system comprising a compressor 8, a condenser 9, a refrigerant-receiver 10, and a circulating-line 11 for the refrigerant which may be of any suitable construction, as well understood in the art. An electric-motor 12 is suitably connected to drive the compressor 8. A thermostat switch 13, located in the refrigerating compartment, is adapted responsively to predetermined temperature changes to control circuits for starting and stopping a starting motor 14. A switch 15, the operation of which is controlled by the pressure of cooling water, is included in a circuit comprising conductors 16 and 17 for operating the compressor-driving motor 12.

The circuit for driving the compressor and the circuits for the compressor driving motor and the thermostatically controlling circuits for the starting motor are all controlled by a rotatable switch 30 which is adapted to be operated by the starting motor 14. This switch comprises a conductor ring 70 having a portion thereof adapted to maintain constant electrical contact with a brush-contact 71; segmental portions 72 adapted to engage a brush-contact 74, and cams 75 of insulating material between the portions 72 to alternately make and break contact with brush 74. The body of the rotatable member 70 is of insulating material and cams 75 are shaped to put the brush 74 under tension preparatory to making contact with either of the ring portions 72 and to cause the brushes to snap against the conductor ring. Brush 74 is connected to conductor 17 of the circuit for the compressor-driving motor 12 and brush 71 is connected to the line-conductor 20. The switch 30 also comprises a conductor ring 76, having its central portion formed to establish constant electrical connection with a brush-contact 77, to which the other line conductor 21 is connected. Ring 76 has, at one side, segmental portions 78 adapted to engage a brush-contact 79. Cams 82 of insulating material are disposed between the conductor portions 78 to electrically disconnect brush 79 from the conductor ring 76 during the rotation of the switch 30. Insulating portions 83 are disposed between ring-portions 80. A conductor 84 connects one of the thermostatic switch contacts 85 and the brush 79. Conductor 16, in which the switch 15 is included, connects motor 12 and the conductor 84. The conductor 85' connects brush 81 and the thermostatic switch-contact 86. The starting-motor 14 is included in a conductor 22 connecting the thermostatic switch 13 and the line-conductor 20. The brushes 74, 71, 81, 77, and 79 are all secured to a block of insulation 90 which is secured to a plate 91. Said plate is adjustably connected, as at 92, to a post 93, so that the brushes may be adjusted to insure proper coöperative relation to the switch 30.

The starting motor 14 is connected to drive the shaft 31, on which the switch 30 is secured, through a train of reducing gears comprising a pinion 32 which meshes with a gear 33 on a shaft 34 and drives a pinion 35 which meshes with a gear 36 on a shaft 37 which drives a pinion 38 which meshes with and drives a gear 39 fixed to the shaft 31. These shafts 34, 37 and 31 are all mounted in a suitable inclosing case 40.

Shaft 31 has a coupling 47 at one end which is operatively connected to rotate a valve 48 which controls the supply of water to the condenser. A supply pipe 45 conducts cooling water to a T-coupling 52 which is connected to valve 48 and a pipe 49, in which a regulating valve 50 is included, conducts water from valve 48 to the condenser 9. Coupling 47 consists of a sleeve 53 provided with slots 54 to receive pins 55 on the shaft 56 of the valve 48 which may be of the usual form of plug valve. The rotating switch 30 is mounted on one end and the connection for operating the water valve 48 is mounted on the other end of shaft 31, and, as a result, said shaft serves to directly operate the switch for controlling the circuits for the compressor-motor and the starting motor and the water valve.

To interrupt the circuit for the compressor-motor, when the water supply fails or is deficient, switch 15 is controlled by a diaphragm 60, the underside of which is exposed to the pressure of cooling water in the supply pipe 45. This cooling water is delivered into a casing 61 through a duct 62 which is connected to the T-coupling 52. This diaphragm is secured on the top of said casing by a frame 63. A plunger 64 engages the top of said diaphragm and a spring 65 is applied to normally force the plunger downwardly against the diaphragm. A stem 66 on this plunger is vertically movable in an adjustable sleeve 67 and its upper end is adapted to engage a stud 68 that is suitably connected to hold the switch 15 normally disconnected from contacts 15'. When the pressure of the cooling liquid against the underside of the diaphragm 60 is insufficient to overcome the pressure of spring 65, the circuit for operating the compressor motor will be inoperative until the pressure has been restored.

The operation of the apparatus will be as follows: When the temperature in the refrigerating chamber rises above the predetermined maximum, thermostat 13 will engage contact 86 and complete a circuit for the operation of the starting motor as follows; line conductor 21, brush 77, ring 76, brush 81, contact 86, thermostat 13, conductor 22, in which the motor 14 is included, and line conductor 20. The motor 14 will operate shaft 31 a quarter turn or 90° through the reducing gearing and then brush 81 will pass onto the insulation 83 to interrupt the circuit and cause said motor to stop. Then, at such time, brush 74 will engage a ring portion of the ring 70 and a circuit for the operation of the motor 12 for driving the compressor will be established, as follows; line conductor 21, brush 77, ring 76, ring portion 78, brush 79, conductors 84, 16, motor 12, conductor 17, brush 74, ring parts 72, 70, brush 71, and line conductor 20. Said operation of the shaft 31 will also open the water valve 48 to supply cooling liquid to the condenser. If the pressure of water in the supply is sufficient for the proper operation of the apparatus, it will lift the diaphragm 60 against the force of spring 65 and keep the switch 15 in position to close the conductor 16 of the circuit for operating the motor 12 which drives the compressor. If said pressure is insufficient for that purpose, said circuit will remain open at the switch 15. Assuming the water pressure to be sufficient, the compressor 12 will operate until the compressor has been operated sufficiently to reduce the temperature in the refrigerating chamber to the predetermined minimum, whereupon, thermostat 13 will engage contact 85 and close the circuit for the operation of the starting motor as follows; line conductor 21, brush 77, ring 76, ring portion 78, brush 79, conductor 84, contact 85, thermostat 13, conductor 22, in which the motor 14 is included, and line conductor 20. The starting motor will continue to operate until the shaft 31 has been turned 90° and then brush 79 will pass onto insulation 82 and interrupt said circuit and cause the starting motor to stop. At such time, the circuit for the motor 12 will also be interrupted, because the brush 74 will have passed onto one of the insulating cams 75. The controlling mechanism will then be in normal position in readiness for another cycle of operations. It will be understood that switch 30 and associated parts are formed to cause a complete cycle of operations during each half revolution of shaft 31.

The invention exemplifies controlling mechanism for automatic refrigerating apparatus, which is simple in construction and efficient in operation.

This application exemplifies subject-matter which is a continuation in part of subject matter disclosed in an application filed by me July 15, 1915, Serial No. 39,971 which has matured into Patent 1,284,965, November 19, 1918.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In refrigerating apparatus, the combination with a compressor, a circulating line, a condenser, and a motor for driving the compressor, of mechanism for automatically controlling said motor, comprising a thermostat, a starting motor, a shaft operable by the starting motor, a rotatable switch on said shaft, a valve for cooling liquid for the condenser axially alined with said shaft, an operative connection between said shaft and said valve, and switch connections operated by said shaft for controlling the operation of the starting motor for limited periods.

2. In refrigerating apparatus, the combination with a compressor, a circulating line, and a motor for driving the compressor, of mechanism for automatically controlling said motor, comprising a thermostat, a starting motor, a shaft operable by the starting motor, a rotatable switch on said shaft, a valve for the cooling liquid adjacent one end of the shaft, an operative connection between said shaft and said valve, and switch connections operated by said shaft for controlling the operation of the starting motor for limited periods.

3. In refrigerating apparatus, the combination with a compressor, a circulating line, and a motor for driving the compressor, of mechanism for automatically controlling said motor, comprising a thermostat, a starting motor, a shaft operable by the starting motor, a rotatable switch on said shaft, having cam projections thereon, and a series of brushes coöperating with said rotatable switch for controlling the operation of the starting motor for limited periods.

4. In refrigerating apparatus, the combination with a compressor, a circulating line, and a motor for driving the compressor, of mechanism for automatically controlling said motor, comprising a thermostat, a starting motor, a shaft operable by the starting motor, a rotatable switch on said shaft, having cam projections thereon, and a series of brushes coöperating with said rotatable switch for controlling the operation of the starting motor and the motor for driving the compressor.

5. In refrigerating apparatus, the combination with a compressor, a circulating line, and a motor for driving the compressor, of mechanism for automatically controlling said motor, comprising a thermostat, a starting motor, a shaft operable by the starting motor, a rotatable switch on said shaft having cam projections thereon and a plurality of conductor rings.

6. In refrigerating apparatus, the combination of a compressor, a condenser, a refrigerant line connected to the compressor, means for supplying cooling liquid to the condenser, a motor for driving the compressor, a switch for controlling the operation of said motor, means for thermostatically controlling the operation of the switch comprising a motor, a rotary valve for controlling the supply of water to the condenser, and means operated by said controlling motor for perdetermined periods, for operating said valve and shifting said switch.

7. The combination with a compressor, a circulating line, a motor for driving the compressor, and a condenser, of mechanism for automatically controlling the operation of the motor responsive to temperature changes, means for supplying cooling liquid to the condenser, and a device for rendering the motor inoperative when the pressure of the cooling medium is deficient, comprising a flexible diaphragm connected to said supply means and a switch operated by said diaphragm, said automatic controlling mechanism comprising a motor.

8. The combination with a compressor, a circulating line, a motor for driving the compressor, and a condenser, of mechanism for automatically controlling the operation of the motor responsive to temperature changes, means for supplying cooling liquid to the condenser, and a device for rendering the motor inoperative when the pressure of the cooling medium is deficient, a chambered member connected to receive fluid from said supply means, an open frame secured to said member and securing the diaphragm thereto, a switch and an operative connection between the switch and the diaphragm, said automatic controlling mechanism comprising a motor.

AUGUST P. ANDERSON.